United States Patent [19]

Forbes et al.

[11] 3,894,119

[45] July 8, 1975

[54] GRAFT COPOLYMERS OF POLYSTYRENE AND POLYISOBUTYLENE

[75] Inventors: Eric Simon Forbes, Lightwater; Ian Grieg Meldrum, Little Sandhurst near Camberley, both of England

[73] Assignee: The British Petroleum Company Limited, London, England

[22] Filed: Nov. 10, 1972

[21] Appl. No.: 305,228

[30] Foreign Application Priority Data

Nov. 16, 1971 United Kingdom............... 53079/71

[52] U.S. Cl. .................. 260/896; 260/886; 252/59
[51] Int. Cl. ............................................ C08f 29/12
[58] Field of Search..................... 260/896, 886, 878

[56] References Cited
FOREIGN PATENTS OR APPLICATIONS

| 640,566 | 7/1950 | United Kingdom | |
| 235,262 | 10/1957 | Australia | 260/878 |
| 640,567 | 7/1950 | United Kingdom | |
| 575,571 | 5/1959 | Canada | 260/878 |

*Primary Examiner*—John C. Bleutge
*Assistant Examiner*—C. J. Seccuro
*Attorney, Agent, or Firm*—Morgan, Finnegan, Durham & Pine

[57] ABSTRACT

Copolymers useful as shear stable viscosity index improvers, are graft copolymers of polyisobutylene onto a polystyrene backbone. The copolymers are formed by the grafting of polyisobutylene onto the polystyrene backbone using Friedel Crafts catalysts.

2 Claims, No Drawings

GRAFT COPOLYMERS OF POLYSTYRENE AND POLYISOBUTYLENE

This invention relates to polymers and a method for their preparation, more particularly it relates to copylymers of polystyrene and polyisobutylene and to methods of their preparation.

Polystyrene and polyisobutylene copolymers of the present invention have a wide range of uses in the manufacture of articles, packaging materials and certain of the copolymers are useful as viscosity index improvers in lubricating oils.

The viscosity index of a lubricating oil is a measure of the change of viscosity of the lubricating oil with change of temperature. The higher the viscosity index of the oil, the less decrease in viscosity with increase in temperature of the oil. The viscosity index of an oil can be calculated by ASTM method D2270 (IP 226/68).

It is known from United Kingdom Pat. Nos. 640,567 and 681,428 to alkylate polystyrene of molecular weight 20,000 to 80,000 (Staudinger) with a propylene polymer to form an alkylated polystyrene with viscosity index improving properties. The polypropylenes described are formed by polymerising propylene using phosphoric acid as a catalyst and the polymers have a boiling point of 55°C to 235°C, and are mixtures of dimers, trimers and tetramers of propylene. These patents also show that polystyrenes of higher molecular weight are readily shared and are consequently little use as viscosity index improvers.

United Kingdom Pat. No. 640,566 describes the alkylation of a polystyrene of molecular weight above 3000 with an alkyl halide or dimer, trimer or tetramer of propylene or butylene in the presence of an organic nitro-compound. This patent states that for viscosity temperature improvers of mineral oils the polystyrene in the copolymer should have a molecular weight of less than 60,000, and describes a process whereby a polystyrene of molecular weight above 60,000 can have its molecular weight reduced.

We have surprisingly found that graft copolymers of polystyrene and polyisobutylene in which higher molecular weight polystyrenes and polyisobutylenes are used have excellent viscosity modifying properties and some are very shear stable.

According to the invention there is provided a graft copolymer of polystyrene and a polyisobutylene comprising a polystyrene back-bone of molecular weight 50,000 to 1,000,000 having joined thereto polyisobutylene groups of molecular weight 750 to 1,000,000, whereby each polyisobutylene group is attached to the polystyrene back-bone.

The molecular weight of the polystyrene back-bone is preferably 50,000 to 500,000, more preferably 80,000 to 450,000 and most preferably 80,000 to 3,000,000.

The molecular weight of the polyisobutylene groups is preferably 1,000 to 20,000 most preferably 2,500 to 10,000.

The amount of polyisobutylene in the copolymer is preferably 15–50% by weight, more preferably 20–40% wt., most preferably 20–30% wt.

It is thought that the polyisobutylene groups are attached to the benzene nuclei of the polystyrene groups.

When the copolymers of the present invention are used in lubricating or other oils as viscosity index modifiers, the copolymer used should be soluble in the oil.

The solubility of the copolymer in the oil is affected by the molecular weight of the polystyrene, the molecular weight of the polyisobutylene, the ratio of polystyrene to polyisobutylene and the nature of the oil. Generally speaking it has been found that the copolymers formed from the lower molecular weight polyisobutylenes and higher molecular weight polystyrenes are most soluble in mineral oils.

The invention also provides a lubricating oil composition which comprises a lubricating oil having dissolved therein a graft copolymer of polystyrene and polyisobutylene as described above.

The lubricating oil composition preferably comprises 0.1 to 15% wt. of the graft copolymer, more preferably 0.5 to 10% wt.

As well as being used in lubricating oils the copolymer of the present invention can be used in hydraulic and other similar oils.

The graft copolymers of the present invention can be prepared by Friedel-Crafts catalysis of the reaction of polyisobutylene and polystyrene.

According to the invention there is provided a method of preparing graft copolymers of polystyrene and polyisobutylene which comprises to reacting a polystyrene of molecular weight 50,000 to 1,000,000 with a polyisobutylene of molecular weight 750 to 1,000,000 in the presence of a Friedel-Crafts catalyst.

The polystyrene preferably has a molecular weight of 50,000 to 3,600,000, more preferably 50,000 to 500,000 and most preferably 80,000 to 450,000.

The polyisobutylene preferably has a molecular weight of 750 to 50,000 more preferably 1,000 to 20,000 and most preferably 2,500 to 10,000.

The weight ratio of polystyrene to polyisobutylene is preferably 40:60 to 85:15 measured as to the amount in the final product, more preferably 60:40 to 80:20 and most preferably 80:20 to 70:30.

Friedel-Crafts catalysts are a well known range of catalysts, and Friedel-Crafts polymerisation and alkylation catalysts can be used. The preferred catalysts are aluminium chloride, boron trifluoride and stannic chloride.

The Friedel-Crafts catalyst is preferably present in an amount of 0.01 to 5% wt. based on the total weight of the reaction mixture.

The reaction is preferably carried out in an inert solvent such as a chlorinated hydrocarbon, e.g. dichlorobenzene, 1,2-dichloroethane or trichloroethylene, a particularly preferred solvent is a mixture of 1,2-dichloroethane and trichloroethylene. Preferably there is also present in the reaction mixture an organic nitro compound e.g. a nitro-alkane such as nitro-propane or nitro-benzene. A preferred method of carrying out the invention is to dissolve the polystyrene in the solvent, add the Friedel-Crafts catalyst and organic nitro compound, and then add the polyisobutylene dissolved in more solvent. The reaction is preferably carried out with gentle warming e.g. to 100°C to facilitate the reaction.

If the copolymer is to be used as a viscosity index improver, a lubricating oil can be added to the reaction mixture before removal of the solvents, to that when the solvents are removed an oil concentrate is obtained.

In this specification and claims the molecular weight of the polystyrene is expressed as a weight average, and the molecular weight of the polyisobutylene is expressed as a number average.

The invention will now be described with reference to the following Examples.

EXAMPLE 1

Polystyrene (30g) of weight average molecular weight of 80,000 was dissolved in 200 mls. of a 2:1 mixture of trichloroethylene and 1,2-dichloroethane in a stirred flask. A solution of 2g of $AlCl_3$ in 30 mls 2-nitropropane was then added to the flask.

A polyisobutylene of number average molecular weight 2,400 (14 grms) was dissolved in 70 mls of a 2:1 mixture of trichloroethylene and 1,2-dichloroethane and pumped in over a period of 0.5 hour. The reaction temperature was maintained at 40° – 50°C and the reaction completed in 2 hours.

The activity of the $AlCl_3$ catalyst was then killed by the addition of dilute HCl. The aqueous layer was separated and organic layer washed with water. The polymer was precipitated by methanol, dissolved in toluene and reprecipitated to remove unreacted polyisobutylene. It was finally dried in a vacuum oven. The copolymer formed consisted of a polystyrene back-bone having the polyisobutylene groups attached randomly to the back-bone.

EXAMPLE 2

Example 1 was repeated using various polystyrenes and polyisobutylenes in differing amounts.

The polymers obtained were dissolved in a solvent refined mineral oil of viscosity at 100°C of 32 – 35 centistokes and the viscosity at 210°C of 5.29 centistokes, to form a 2% solution. The viscosities of the solutions at 100°C and 210°C were measured and the viscosity index calculated by ASTM method D2270 to give the VIE value.

The oil compositions obtained were sheared by the Diesel Injector Rig test, in this test 50 ml of the test oil is placed in a glass reservoir and is pumped through a diesel injector and then into a receiving vessel, at 3000 psi, this constitutes one cycle. The viscosities of the solutions were again measured 100°C to 210°C and the viscosity index again calculated.

The results are shown below in the Tables.

Table 1a

Polystyrene-$M_w$ = 80,000 Polyisobutylene-$M_n$ = 2,400
Approx Kinematic Viscosity (cSt)

| PIB Content % | Before Shear | | | After Shear | | |
|---|---|---|---|---|---|---|
| | 100°F | 210°F | VIE | 100°F | 210°F | VIE |
| 32 | 47.54 | 7.65 | 139 | 45.33 | 7.36 | 137 |
| 47 | 44.38 | 7.11 | 131 | 44.01 | 7.01 | 129 |

Table 1b

Polystyrene-$M_w$ = 180,000 Polyisobutylene-$M_n$ = 2,400
Approx Kinematic Viscosity (cSt)

| PIB Content % | Before Shear | | | After Shear | | |
|---|---|---|---|---|---|---|
| | 100°F | 210°F | VIE | 100°F | 210°F | VIE |
| 60 | 51.67 | 8.04 | 137 | 47.55 | 7.35 | 128 |
| 48 | 52.27 | 8.25 | 141 | 48.71 | 7.59 | 132 |

Table 1c

Polystyrene – $M_w$ = 270,000 Polyisobutylene – $M_n$ = 2,400
Approx Kinematic Viscosity (cSt)

| PIB Content % | Before Shear | | | After Shear | | |
|---|---|---|---|---|---|---|
| | 100°F | 210°F | VIE | 100°F | 210°F | VIE |
| 62 | 54.60 | 8.61 | 145 | 46.71 | 7.34 | 131 |
| 48 | 55.89 | 8.96 | 152 | 49.14 | 7.70 | 134 |
| 78 | 45.94 | 7.25 | 130 | 43.29 | 6.74 | 120 |

32-44 - insoluble in Base Oil

Table 2a

Polystyrene – $M_w$ = 80,000 Polyisobutylene – $M_n$ = 6,100
Approx Kinematic Viscosity (cSt)

| PIB Content % | Before Shear | | | After Shear | | |
|---|---|---|---|---|---|---|
| | 100°F | 210°F | VIE | 100°F | 210°F | VIE |
| 37 | 49.48 | 7.90 | 140 | 47.80 | 7.55 | 134 |
| 45 | 50.09 | 7.85 | 136 | 48.09 | 7.51 | 131 |

Table 2b

Polystyrene – $M_w$ = 180,000 Polyisobutylene – $M_n$ = 6,100
Approx Kinematic Viscosity (cSt)

| PIB Content % | Before Shear | | | After Shear | | |
|---|---|---|---|---|---|---|
| | 100°F | 210°F | VIE | 100°F | 210°F | VIE |
| 45 | 62.18 | 9.78 | 152 | 56.62 | 8.23 | 140 |
| 38 | 58.28 | 9.21 | 150 | 52.31 | 8.17 | 139 |
| 51 | 57.51 | 9.03 | 147 | 51.49 | 8.04 | 137 |

Table 2c

Polystyrene – $M_w$ = 270,000 Polyisobutylene – $M_n$ = 6,100
Approx Kinematic Viscosity (cSt)

| PIB Content % | Before Shear | | | After Shear | | |
|---|---|---|---|---|---|---|
| | 100°F | 210°F | VIE | 100°F | 210°F | VIE |
| 43 | 62.05 | 9.95 | 157 | 52.88 | 8.27 | 140 |
| 48 | 66.18 | 10.31 | 154 | 54.60 | 8.46 | 140 |
| 57 | 69.46 | 10.80 | 159 | 53.49 | 8.27 | 138 |
| 74 | 62.94 | 9.88 | 153 | 49.47 | 7.68 | 132 |
| 37 | 74.47 | 12.75 | 184 | 52.95 | 8.43 | 145 |
| 26 | 42.69 | 10.08 | 248 | 42.29 | 10.00 | 248 |

Table 2d

Polystyrene – $M_w$ = 430,000 Polyisobutylene – $M_n$ = 6,100
Approx Kinematic Viscosity (cSt)

| PIB Content % | Before Shear | | | After Shear | | |
|---|---|---|---|---|---|---|
| | 100°F | 210°F | VIE | 100°F | 210°F | VIE |
| 25 | 41.22 | 10.84 | 250 | 41.40 | 9.33 | — |

Sheared at 80°C

Table 3

Polystyrene – $M_w$ = 270,000 Polyisobutylene – $M_n$ = 9,000
Approx Kinematic Viscosity (cSt)

| PIB Content % | 100°F | 210°F | VIE |
|---|---|---|---|
| 25 | 44.81 | 10.11 | 236 |

Hyvis 10,000 Copolymer

Table 4

Polystyrene — $M_w$ = 270,000  Polyisobutylene — $M_n$ = 12,000

| Approx PIB Content % | Kinematic Viscosity (cSt) 100°F | 210°F | VIE |
|---|---|---|---|
| 25 | 41.81 | 7.91 | 176 |

Various commercially used polymeric viscosity index improvers were tested for shear stability at the same concentration as the viscosity index improvers of the invention, and the results are shown in the Table 5.

| Polymeric Viscosity Index Improver | Before Shearing Viscosity at 100°F | Viscosity at 210°F | VIE | After Shearing Viscosity at 100°F | Viscosity at 210°F | VIE |
|---|---|---|---|---|---|---|
| A | 48.34 | 8.65 | 171 | 41.96 | 7.21 | 147 |
| B | 52.8 | 10.03 | 194 | 47.70 | 8.03 | 152 |
| C | 61.49 | 10.53 | 174 | 53.91 | 8.91 | 159 |
| D | 43.31 | 6.82 | 124 | 42.06 | 6.56 | 118 |
| E | 42.69 | 10.08 | 248 | 42.29 | 10.0 | 248 |
| F | 50.09 | 7.85 | 136 | 48.09 | 7.51 | 131 |

All the polymers were dissolved at 2% wt. concentration in the base oil.
A is a polyalkyl methacrylate of weight average molecular weight about 350,000.
B is a polyalkyl methacrylate of weight average molecular weight about 500,000.
C is a polymethacrylate of weight average molecular weight above 400,000.
D is a polyisobutylene of number average molecular weight about 30,000.
E is a polystyrene/polyisobutylene VI improver of 6 of Table 2c.
F is a polystyrene/polyisobuutylene VI improver of 2 of Table 2a.

As can be seen from the Tables, the present invention enables the formulation of oils having excellent viscosity index and very good shear stability. The previously used polymers which have very good viscosity index improving effects (polyalkyl methacrylates) have much worse shear stability, and the more shear stable polymers (the polyisobutylenes) have worse viscosity index improving ability.

We claim:

1. A graft copolymer of polystyrene and polyisobutylene which consists essentially of 85 to 40% weight of a polystyrene of weight average molecular weight 50,000 to 500,000 and 15 to 60% weight of a polyisobutylene of number average molecular weight 2,500 to 20,000, the said graft copolymer being in the form of a polystyrene back-bone having each polyisobutylene group attached thereto and prepared by reacting polystyrene and polyisobutylene.

2. A graft copolymer as claimed in claim 1 which consists essentially of 80 to 70% of a polystyrene of molecular weight 80,000 to 450,000 and 20 to 30% weight of a polyisobutylene of molecular weight 2,500 to 10,000.

* * * * *